US 008706955B2

(12) United States Patent  
Fai et al.

(10) Patent No.: US 8,706,955 B2
(45) Date of Patent: Apr. 22, 2014

(54) BOOTING A MEMORY DEVICE FROM A HOST

(75) Inventors: Anthony Fai, Palo Alto, CA (US); Nir Jacob Wakrat, Los Altos, CA (US); Nicholas Seroff, Los Gatos, CA (US)

(73) Assignee: Apple Inc., Cupertion, CA (US)

( * ) Notice: Subject to any disclaimer, the term of this patent is extended or adjusted under 35 U.S.C. 154(b) by 339 days.

(21) Appl. No.: 13/175,597

(22) Filed: Jul. 1, 2011

(65) Prior Publication Data

US 2013/0007347 A1    Jan. 3, 2013

(51) Int. Cl.
    *G06F 3/06*      (2006.01)
    *G06F 12/02*     (2006.01)

(52) U.S. Cl.
    CPC ............ *G06F 3/0604* (2013.01); *G06F 3/0632* (2013.01); *G06F 3/0655* (2013.01); *G06F 3/0679* (2013.01); *G06F 12/0246* (2013.01)
    USPC ................... 711/103; 711/104; 711/E12.008; 713/2

(58) Field of Classification Search
    CPC ........................................................ G06F 3/123
    See application file for complete search history.

(56) References Cited

U.S. PATENT DOCUMENTS

| 5,737,520 | A  | 4/1998  | Gronlund et al. |
| 5,768,498 | A  | 6/1998  | Boigelot et al. |
| 6,279,127 | B1 | 8/2001  | Moore |
| 6,463,550 | B1 | 10/2002 | Cepulis et al. |
| 6,496,945 | B2 | 12/2002 | Cepulis et al. |
| 6,591,272 | B1 | 7/2003  | Williams |
| 6,708,231 | B1 * | 3/2004 | Kitagawa ........................ 710/10 |
| 6,751,788 | B1 | 6/2004  | Goser |
| 6,970,970 | B2 | 11/2005 | Jung et al. |
| 7,043,664 | B1 * | 5/2006 | Chiloyan ..................... 714/5.11 |
| 7,464,259 | B2 | 12/2008 | Sukegawa et al. |
| 2001/0042225 | A1 | 11/2001 | Cepulis et al. |
| 2002/0066080 | A1 | 5/2002 | O'Dowd |

(Continued)

FOREIGN PATENT DOCUMENTS

| JP | 2004-117168 | 4/2004 |
| JP | 2006-012267 | 1/2006 |

(Continued)

OTHER PUBLICATIONS

IEEE. IEEE 100: The Authoritative Dictionary of IEEE Standards Terms. Dec. 2000. IEEE. 7th ed. pp. 113, 659.*

(Continued)

*Primary Examiner* — Nathan Sadler
(74) *Attorney, Agent, or Firm* — Van Court & Aldridge LLP (57) ABSTRACT

In one implementation, a method includes receiving, at a memory device, an instruction to boot the memory device, wherein the memory device includes non-volatile memory accessible by a controller of the memory device; and, in response to receiving the instruction to boot the memory device, obtaining, by the memory device, firmware from a host device, wherein the host device is separate from and communicatively coupled to the memory device. The method can also include booting the memory device using the firmware from the host device, wherein the memory device boots separately from the host device, and the host device performs operations using data or instructions stored in the non-volatile memory and obtained through communication with the memory controller of the memory device.

26 Claims, 5 Drawing Sheets

(56) References Cited

U.S. PATENT DOCUMENTS

| | | |
|---|---|---|
| 2003/0065935 A1* | 4/2003 | Neufeld .................. 713/200 |
| 2003/0120980 A1 | 6/2003 | Harris |
| 2003/0140282 A1 | 7/2003 | Kaler et al. |
| 2003/0163765 A1 | 8/2003 | Eckardt et al. |
| 2004/0103347 A1* | 5/2004 | Sneed et al. ................ 714/32 |
| 2004/0255111 A1* | 12/2004 | Lim ............................. 713/2 |
| 2005/0144493 A1 | 6/2005 | Cromer et al. |
| 2005/0160257 A1* | 7/2005 | Kruger et al. ................ 713/2 |
| 2005/0229020 A1 | 10/2005 | Goodman et al. |
| 2006/0069904 A1 | 3/2006 | Hatakeyama et al. |
| 2006/0107071 A1* | 5/2006 | Girish et al. .............. 713/191 |
| 2006/0236198 A1 | 10/2006 | Lintz, Jr. et al. |
| 2006/0242398 A1 | 10/2006 | Fontijn et al. |
| 2007/0055914 A1 | 3/2007 | Chandwani et al. |
| 2007/0061634 A1 | 3/2007 | Marisetty et al. |
| 2007/0088940 A1* | 4/2007 | Conley ......................... 713/1 |
| 2007/0180223 A1 | 8/2007 | Tanaka et al. |
| 2007/0186092 A1 | 8/2007 | Uemura et al. |
| 2007/0233858 A1 | 10/2007 | Goff et al. |
| 2008/0034151 A1* | 2/2008 | Lu et al. ................... 711/103 |
| 2008/0165952 A1* | 7/2008 | Smith et al. ................ 380/28 |
| 2008/0168275 A1* | 7/2008 | De Atley et al. .......... 713/189 |
| 2008/0256400 A1 | 10/2008 | Yang et al. |
| 2009/0138754 A1 | 5/2009 | Edwards et al. |
| 2009/0254776 A1 | 10/2009 | Gonzalez et al. |
| 2010/0180068 A1 | 7/2010 | Matsumoto et al. |
| 2010/0235831 A1 | 9/2010 | Dittmer |
| 2010/0274953 A1 | 10/2010 | Lee et al. |
| 2010/0318719 A1 | 12/2010 | Keays et al. |
| 2011/0060897 A1 | 3/2011 | Toelkes |
| 2012/0054541 A1 | 3/2012 | Byom et al. |

FOREIGN PATENT DOCUMENTS

| | | | | |
|---|---|---|---|---|
| JP | 2006-146485 | | 6/2006 | |
| JP | 2007-213292 | | 8/2007 | |
| JP | 2007-233667 | | 9/2007 | |
| JP | 2009-205413 | | 9/2009 | |
| KR | 2001-0069134 | * | 7/2001 | ............ G11B 19/20 |
| KR | 10-0734303 | | 6/2007 | |
| WO | 2010/067901 | | 6/2010 | |
| WO | 2010/083257 | | 7/2010 | |
| WO | 2010/129306 | | 11/2010 | |

OTHER PUBLICATIONS

Sungjin Lee et al. "BlueSSD: An Open Platform for Cross-layer Experiments for NAND Flash-based SSDs." Jun. 22, 2010. WARP 2010. http://hal.archives-ouvertes.fr/docs/00/49/41/43/PDF/WARP2010-lee-snu.pdf.*

English translation of KR 2001-0069134.*

Spanjer. "Flash Management—Why and How?" Nov. 1, 2009, pp. 1-14, http://www.adtron.com/pdf/Flash%20Management%20%28FINAL%29.pdf.

"Control Method for Handling Errors During Power-On Sequence." IBM Technical Disclosure Bulletin, vol. 32, No. 10B, p. 116, Mar. 1, 1990.

"Fully Reprogrammable Fault-Tolerant Flash Memory System." IBM Technical Disclosure Bulletin, vol. 38, No. 8, pp. 83-86, Aug. 1, 1995.

* cited by examiner

BOOTING A MEMORY DEVICE FROM A HOST

BACKGROUND

This document relates to booting a memory device, such as device with flash memory, from a host.

Various types of non-volatile memory (NVM), such as flash memory (e.g., NAND flash memory, NOR flash memory), can be used for mass storage. For example, consumer electronics (e.g., portable media players) use flash memory to store data, including music, videos, images, and other media or types of information.

Memory devices have been configured to boot from information that is stored locally on the devices. For example, a memory device that includes a memory controller (with one or more processors/microprocessors) can boot using firmware that is stored in NVM of the memory device. In another example, a "raw" memory device (a memory device that does not include a memory controller) can boot using trim values that are stored in NVM of the memory device. Trim values can be loaded into registers of a raw memory device and can be used by circuitry on a raw memory device to control various operations of the raw memory device, such as timing, pulse counts, and/or applied voltage levels.

SUMMARY

This document generally describes technologies relating to booting memory devices from a host device. A host device can store boot information (e.g., firmware, trim values) for one or more memory devices and can provide such boot information to the memory devices over one or more communication channels (e.g., a bus) between the host device and the memory devices. Boot information can be provided to a memory device by a host device in response to or in conjunction with an indication to boot the memory device. For example, a host device can provide a boot command to a memory device and can subsequently provide boot information to the memory device in response to a signal from the memory device indicating that the memory device is ready to receive the boot information. In another example, a memory device that is powered off can receive a signal that prompts the memory device to power on and boot. In response to such an indication, the memory device can request and receive boot information from the host device.

In one implementation, a method includes receiving, at a memory device, an instruction to boot the memory device, wherein the memory device includes non-volatile memory accessible by a controller of the memory device; and, in response to receiving the instruction to boot the memory device, obtaining, by the memory device, firmware from a host device, wherein the host device is separate from and communicatively coupled to the memory device. The method can also include booting the memory device using the firmware from the host device, wherein the memory device boots separately from the host device, and the host device performs operations using data or instructions stored in the non-volatile memory and obtained through communication with the memory controller of the memory device.

In another implementation, a method includes providing, by a host device, a boot command to a memory device instructing the memory device to boot using firmware from the host device, wherein the host device is separate from and communicatively coupled to the memory device, and the memory device includes non-volatile memory. The method can also include receiving, at the host device, an indication that the memory device is ready to receive the firmware from the host device; and, in response to receiving the indication, transmitting, by the host device, the firmware to the memory device, wherein transmission of the firmware to the memory device causes the memory device to boot using the firmware, wherein the memory device boots separately from the host device.

In another implementation, a memory device includes non-volatile memory, a host interface adapted to communicatively couple the memory device to a host device, and a memory controller configured to perform memory operations on the non-volatile memory and adapted to communicate with the host device through the host interface. The memory controller can further be configured to receive an instruction to boot the memory device from the host device through the host interface; in response to receiving the instruction, obtain firmware from the host device; and boot the memory device using the firmware from the host device, wherein the memory device boots separately from the host device, and the host device performs operations using data or instructions stored in the non-volatile memory and obtained through communication with the memory controller of the memory device through the host interface.

In another implementation, a system includes non-volatile memory, and a memory controller configured to perform memory operations on the non-volatile memory and to communicate with a host device through a host interface. The memory controller can further be configured to receive an instruction to boot the memory device from the host device through the host interface; in response to receiving the instruction, obtain firmware from the host device; and boot the memory device using the firmware from the host device, wherein the memory device boots separately from the host device, and the host device performs operations using data or instructions stored in the non-volatile memory and obtained through communication with the memory controller of the memory device through the host interface.

Particular embodiments of the subject matter described in this specification can be implemented so as to realize one or more of the following advantages. Wear on NVM of a memory device can be reduced. For instance, a memory device may toggle on and off with great frequency to reduce power consumption (e.g., toggle off when not being used), which can cause portions of NVM storing boot information for the memory device to be accessed every time the device is powered on to boot the device. Such frequent accessing can wear on the NVM and shorten the lifespan of the NVM. By obtaining boot information from a host device instead of from NVM of a memory device, the wear on the NVM of the memory device can be reduced and the lifespan of the NVM of the memory device can be extended.

The speed with which a memory device boots can be increased, which can minimize delays in accessing data stored by the memory device. For instance, boot information for the memory device can be stored in NVM of a host device and loaded into volatile memory (e.g., random access memory (RAM)) of the host device when the host device boots (e.g., using its own boot information). While memory devices are toggled on and off, the host device can maintain the boot information in and provide the boot information from its volatile memory to the memory devices. This transfer of boot information from volatile memory of the host device to the memory device can be faster than the memory device reading boot information from NVM that is local to the memory device.

The available storage capacity of memory device can be increased and the aggregate storage capacity of a system including a host device and multiple memory devices can be increased. For example, by moving boot information from NVM of a memory device to a host device, the storage space on the NVM of the memory device that would have stored the boot information can be made available to store other information (e.g., data). In another example, a host device can store a single copy of boot information that is common to multiple memory devices instead of each of the multiple memory devices storing a local copy of the boot information. Aggregate storage capacity of a system with multiple memory devices can be increased by avoiding redundant storage of boot information across the multiple memory devices.

Updates and changes to the manner in which a memory device operates can be easily made by updating/changing the boot information provided by a host device to a memory device. For example, if an error is encountered with a memory device, a host device can cause the memory device to reboot using debug firmware (provided by the host to the memory device) instead of with operational firmware that was used when the error was encountered. Debug firmware can cause a memory device to perform various debug operations (e.g., generate an error log, identify a source of an error) and to provide obtained debug information to a host device. A host device can store various types of firmware (e.g., operational firmware, debug firmware, manufacturing firmware) and can switch between which firmware is provided to a memory device depending on the state of the memory device (e.g., error encountered, recent installation of new hardware, operating normally).

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A host device can store boot information (e.g., firmware or trim values) and provide the boot information to one or more memory devices that are connected to the host device over a communication channel (e.g., a bus). Memory device boot information can be provided to memory devices in conjunction with or in response to instructions or requests to boot the memory devices, which may be generated in response to the memory devices being powered on and/or receiving a boot command from the host device. A host device can maintain boot information for memory devices in volatile memory during operation of the memory devices (e.g., by loading the boot information into volatile memory from NVM when the host device boots) and can provide the boot information to the memory devices from the volatile memory. Boot information can be provided to raw memory devices (e.g., memory devices without a memory controller) and/or memory devices that include a memory controller. A host device can store and provide various types of boot information to memory devices, including operational boot information (e.g., used to perform read, write, and erase operations), debug boot information (e.g., used to perform debug operations), and/or manufacturing boot information (e.g., used to test installation and operation of components of a memory device).

Figure 1A:
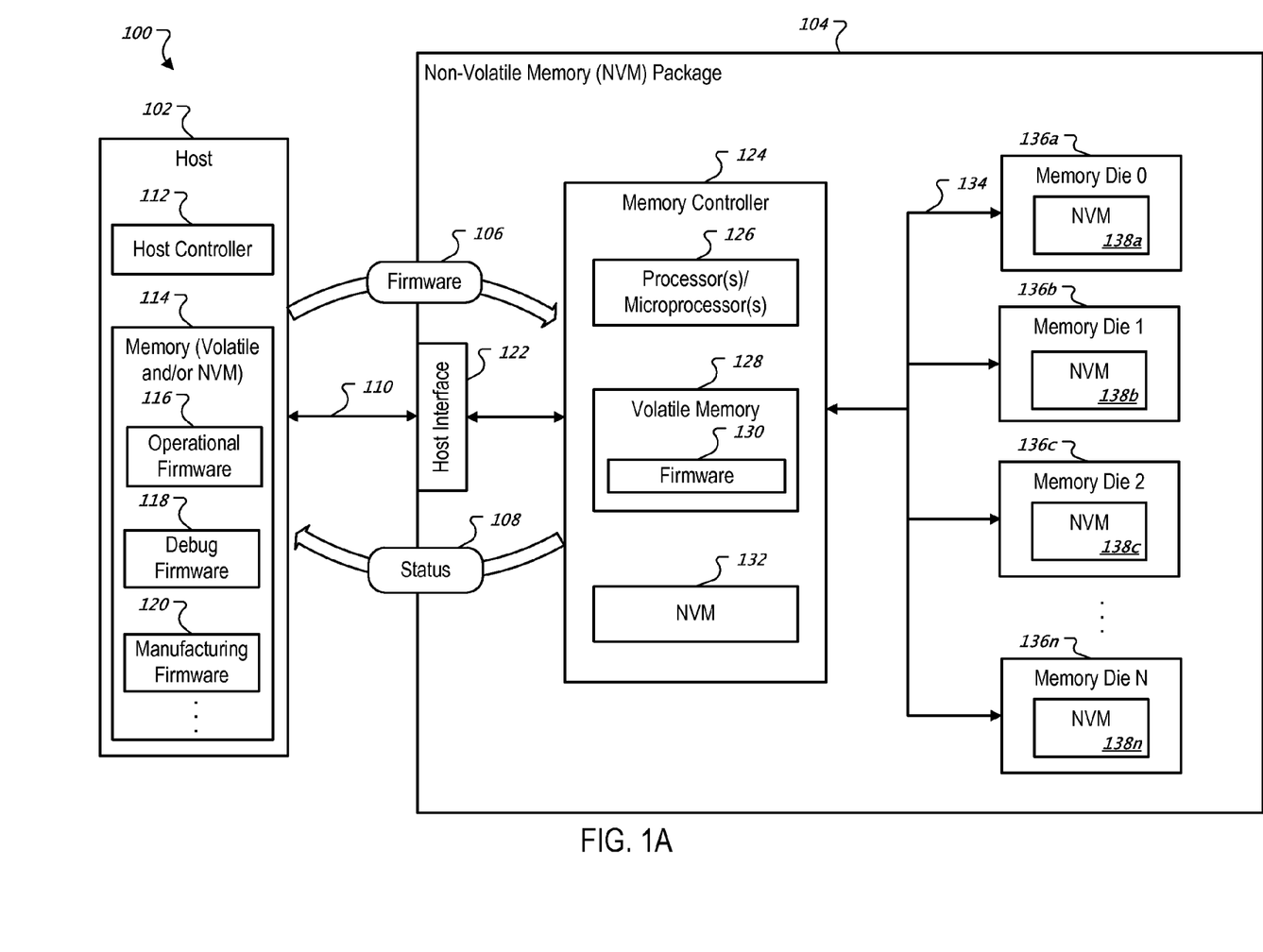
FIG. 1A is a diagram depicting an example system that includes a host device that is configured to provide boot information in the form of firmware to a NVM package that includes a memory controller.

FIG. 1A is a diagram depicting an example system 100 that includes a host device 102 that is configured to provide boot information in the form of firmware to a NVM package 104 that includes a memory controller. For instance, as depicted in the example system 100, the host device 102 can provide firmware 106 for the NVM package 104. The NVM package 104 can send a status message 108 to the host device 102 before, during, and/or in response to receiving the firmware 106. For example, the NVM package 104 may indicate that it is booting in the status message 108 and receive the firmware 106 in response. In another example, the NVM package 104 may indicate that it is ready to receive the firmware 106 after receiving a command to boot from the host device 102. In a further example, NVM package 104 can indicate that various portions of the firmware 106 are received through the status message 108.

The host device 102 can be any of a variety of host devices and/or systems, such as a portable media player, a cellular telephone, a pocket-sized personal computer, a personal digital assistant (PDA), a desktop computer, a laptop computer, and/or a tablet computing device. The NVM package 104 includes NVM and can be a ball grid array package or other suitable type of integrated circuit (IC) package. The NVM package 104 can provide obtain firmware from the host device 102 through a connection 110 (e.g., bus) with the host device 102. The NVM package 104 can be part of and/or separate from the host device 102.

The host device 102 can include a host controller 112 that is configured to interact with the NVM package 104 to obtain debug information from the NVM package 104. The host controller 112 can include one or more processors and/or microprocessors that are configured to perform operations based on the execution of software and/or firmware instructions. Additionally and/or alternatively, the host controller 112 can include hardware-based components, such as application-specific integrated circuits (ASICs), that are configured to perform various operations. Operations performed by the host controller 112 can include determining when to power the NVM package 104 on and off, when to boot the NVM package 104, a type of firmware to provide to the NVM package 104, and providing the firmware 106 to the NVM package 104. For example, the host controller 112 can provide a boot command to the NVM package 104 and, in response to a status message 108 indicating that the NVM package 104 is ready to receive the firmware 106, provide the firmware 106 to the NVM package 104. The host controller 112 can format information (e.g., commands, the firmware 106) transmitted to the NVM package 104 according to a communications protocol used between the host device 102 and the NVM package 104.

The NVM package 104 includes memory 114 (volatile memory and/or NVM) that stores various types of firmware 116-120 that can be provided to the NVM package 104 (i.e., as firmware 106). For example, the host device 102 can load the firmware 116-120 from NVM of the host device 102 to volatile memory when the host device 102 boots. The host device 102 can maintain the firmware 116-120 in the volatile memory during operation of the host device 102 and the NVM package 104. The host device 102 can provide the firmware 116-120 to the NVM package 104 from the volatile memory. In other implementations, the firmware 116-120 can be stored in NVM of the host device 102 and read out of NVM of the host device 102 as needed to boot the NVM package 104. The firmware 116-120 can be executed by the NVM package 104 to perform boot operations (e.g., initialize memory dies, load instructions for operating the NVM package 104 into volatile memory) and/or post-boot operations (e.g., read/write/erase operations, debug operations).

For example, the firmware 106 transferred to the NVM package 104 by the host device 102 can include a boot loader with instructions that, when executed, cause instructions for operating the NVM package 104 to be loaded into volatile memory for execution by the NVM package 104. In another example, the firmware 106 transferred to the NVM package 104 by the host device 102 can include instructions for operating the NVM package 104 and can be loaded into volatile memory (e.g., by a boot loader operation) as part of the booting process of the NVM package 104.

FIG. 1A depicts the example firmware 116-120 as including operational firmware 116, debug firmware 118, and manufacturing firmware 120. The operational firmware 116 causes the NVM package 104 to perform "normal" memory operations, such as performing read, write, and erase operations as requested by the host device 102. The operations firmware 116 may also cause the NVM package 104 to perform memory management operations, such as wear leveling or error correction. The debug firmware 118 causes the NVM package to perform debug operations, such as tracing the source of data errors and generating error logs. The manufacturing firmware 120 tests the installation and operation of various components of the NVM package 104, such as memory dies, I/O signals, and sensors (e.g., temperature sensors). Other types of firmware are also possible. For instance, different versions of the same firmware may be stored by the host device 102 and provided to the NVM package 104 (e.g., firmware version 1.1 and firmware version 1.2).

The host device 102 can communicate with the NVM package 104 over the connection 110. The connection 110 between the host device 102 and the NVM package 104 can be fixed (e.g., fixed communications channel) and/or detachable (e.g., a universal serial bus (USB) port). Interactions with the NVM package 104 can include providing commands (e.g., boot commands, read commands, write commands) and transmitting boot information, e.g., the firmware 106, to the NVM package 104.

The NVM package 104 can interact with the host device 102 over the connection 110 using a host interface 122 and a memory controller 124. Like the host controller 112, the memory controller 124 can include one or more processors and/or microprocessors 126 that are configured to perform operations based on the execution of software and/or firmware instructions. Additionally and/or alternatively, the memory controller 124 can include hardware-based components, such as ASICs, that are configured to perform various operations. The memory controller 124 can perform a variety of operations, such as booting the NVM package 104 using the firmware 106 from the host device 102.

Various memory management functions, such as error correction and wear leveling, can be performed by the host controller 112 and the memory controller 124, alone or in combination. In implementations where the memory controller 124 is configured to perform at least some memory management functions, the NVM package 104 can be termed "managed NVM" (or "managed NAND" for NAND flash memory). This can be in contrast to "raw NVM" (or "raw NAND" for NAND flash memory), in which the host controller 112 external to the NVM package 104 performs memory management functions for the NVM package 104.

The memory controller 124 includes volatile memory 128 and NVM 132. The volatile memory 128 can be any of a variety of volatile memory types, including cache memory and/or RAM. The volatile memory 128 can be used by the memory controller 124 to perform memory operations and/or to temporarily store data that is being read from and/or written to NVM. For example, the volatile memory 128 can store firmware 130, such as the firmware 106 received over the connection 110 to the host device 102, and can use the firmware 130 to perform operations on the NVM package 104 (e.g., read/write operations, debug operations).

The NVM 132 is system memory that can be used by the memory controller 124 to persistently store system information (e.g., debug logs) and/or to temporarily store information, such as firmware, that may not fit in the volatile memory 128. The NVM 132 may be write, read, and/or erase restricted such that only particular system operations with appropriate privileges can access the NVM 132. For instance, the NVM 132 can include instructions stored a particular physical address that are loaded into the volatile memory 128 and executed by the processor/microprocessor 126 in response to a boot signal being received by the memory controller 124 (e.g., a boot command from the host device 102, receiving power from a previously unpowered state). In contrast, access to the NVM 132 may not be permitted in conjunction with operations performed as part of a write command received from the host device 102. In another example, some portions of the firmware 106 received from the host device 102 may be stored in the NVM 132 and loaded into the volatile memory 128 as needed. The NVM 132 can be any of a variety of NVM (e.g., NAND flash memory, NOR flash memory). In some implementations, the NVM 132 also locally and persistently stores firmware for the NVM package 104. In such implementations, the NVM package 104 can use the locally stored firmware by default and the host device 102 can override this default setting by providing the NVM 104 with a "boot from host" command.

The memory controller 124 uses a shared internal bus 134 to access NVM used for persistent data storage. In the example system 100, such NVM is depicted as including multiple memory dies 136a-n that include NVMs 138a-n. The memory dies can be a variety of memory dies, such as integrated circuit (IC) dies. Although only the single shared bus 134 is depicted with regard to the NVM package 104, an NVM package can include more than one shared internal bus. Each internal bus can be connected to multiple memory dies (e.g., 2, 3, 4, 8, 32, etc.), as depicted with regard to the multiple memory dies 136a-n. The memory dies 136a-n can be physically arranged in a variety of configurations, such as being stacked. The NVM 138a-n can be any of a variety of NVM, such as NAND flash memory based on floating gate or charge trapping technology, NOR flash memory, erasable programmable read only memory (EPROM), electrically erasable programmable read only memory (EEPROM), ferroelectric RAM (FRAM), magnetoresistive RAM (MRAM), phase change memory (PCM), or any combination thereof. The memory controller 124 can perform various operations (e.g., read/write operations, debug operations, manufacturing test operations) on the NVM 138a-n using the firmware 130 provided by the host device 102 to boot the NVM package 104.

Figure 1B:
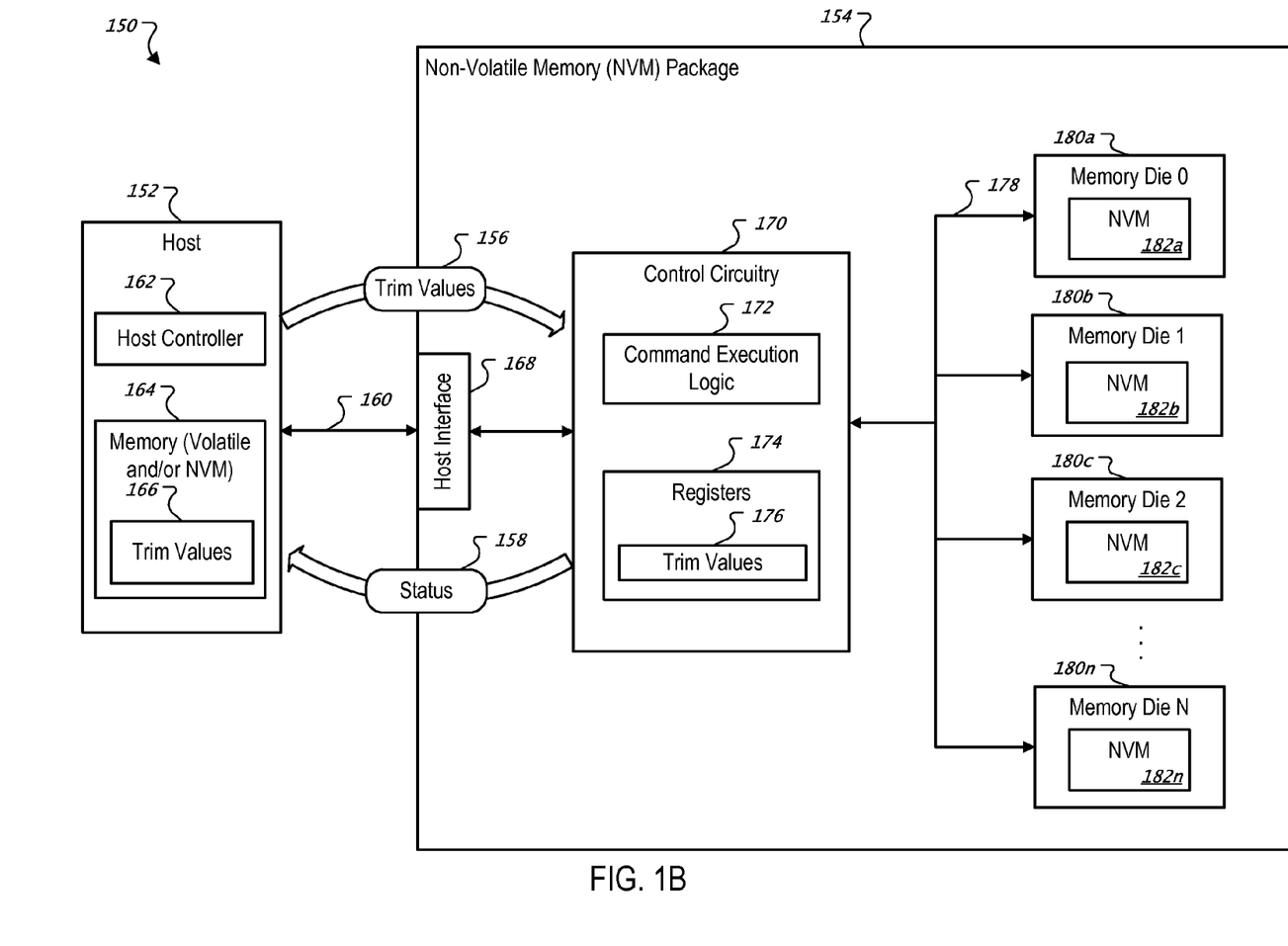
FIG. 1B is a diagram depicting an example system that includes a host device that is configured to provide boot information in the form of firmware to a NVM package that does not include a memory controller.

FIG. 1B is a diagram depicting an example system 150 that includes a host device 152 that is configured to provide boot information in the form of firmware to a NVM package 154 that does not include a memory controller. For instance, as depicted in the example system 150, the host device 152 can provide trim values 156 for the NVM package 154. The NVM package 154 can send a status message 158 to the host device 152 before, during, and/or in response to receiving the trim values 156. For example, the NVM package 154 may indicate that it is booting in the status message 158 and receive the trim values 156 in response. In another example, the NVM package 154 may indicate that it is ready to receive the trim values 156 after receiving a command to boot from the host device 152. In a further example, NVM package 154 can indicate that various portions of the trim values 156 are received through the status message 158.

The host device 152 can be any of a variety of host devices and/or systems, such as a portable media player, a cellular telephone, a pocket-sized personal computer, a personal digital assistant (PDA), a desktop computer, a laptop computer, and/or a tablet computing device. The NVM package 154 includes NVM and can be a ball grid array package or other suitable type of integrated circuit (IC) package. The NVM package 154 can provide obtain firmware from the host device 152 through a connection 160 (e.g., bus) with the host device 152. The NVM package 154 can be part of and/or separate from the host device 152.

The host device 152 can include a host controller 162 that is configured to interact with the NVM package 154 to obtain debug information from the NVM package 154. The host controller 162 can include one or more processors and/or microprocessors that are configured to perform operations based on the execution of software and/or firmware instructions. Additionally and/or alternatively, the host controller 162 can include hardware-based components, such as ASICs, that are configured to perform various operations. Operations performed by the host controller 162 can include determining when to power the NVM package 154 on and off, when to boot the NVM package 154, a type of firmware to provide to the NVM package 154, and providing the trim values 156 to the NVM package 154. For example, the host controller 162 can provide a boot command to the NVM package 154 and, in response to the status 158 indicating that the NVM package 154 is ready to receive the trim values 156, provide the trim values 156 to the NVM package 154. The host controller 162 can format information (e.g., commands, the trim values 156) transmitted to the NVM package 154 according to a communications protocol used between the host device 152 and the NVM package 154.

The host device 152 includes memory 164 (e.g., volatile memory and/or NVM) that stores trim values 166 that can be provided to the NVM package 154. For example, the host device 152 can load the trim values 166 from NVM of the host device 152 to volatile memory when the host device 152 boots. The host device 152 can maintain the trim values 164 in the volatile memory during operation of the host device 152 and the NVM package 154. The host device 152 can provide the trim values 166 to the NVM package 154 from the volatile memory. In other implementations, the trim values 166 can be stored in NVM of the host device 152 and read out of NVM of the host device 152 as needed to boot the NVM package 154.

The trim values 166 can include various values that are used to configure the NVM package 154 to perform memory operations (e.g., read, write, erase) and to interact with the host device 152. For example, the trim values 166 can include values that regulate timing and voltage levels used by the NVM package 154 to perform memory operations and to communicate with the host device 152. For example, trim values 166 can be predetermined data values that, when loaded into volatile memory, are used by components of the NVM package 154 to perform operations, such as reading and/or programming NVM. For instance, the trim values 166 can define a programming voltage level and/or a programming pulse width that are used for data sampling of the NVM in the NVM package 154. During booting, the trim values 166 can be used to initialize the various components of the NVM package 154, including the NVM of the NVM package 154, so that the NVM package 154 is able to reliably read and/or write data to the NVM.

The host device 152 can communicate with the NVM package 154 over the connection 160. The connection 160 between the host device 152 and the NVM package 154 can be fixed (e.g., fixed communications channel) and/or detachable (e.g., a universal serial bus (USB) port). Interactions with the NVM package 154 can include providing commands (e.g., boot commands, read commands, write commands) and transmitting boot information, such as the trim values 156, to the NVM package 154.

The NVM package 154 can interact with the host device 152 over the connection 160 using a host interface 168 and control circuitry 170. The control circuitry 170 can be configured to, at least, perform commands (e.g., read, write) received from the host device 152 through the host interface 168. The control circuitry 170 can be implemented through various hardware components, such as ICs and ASICs. The control circuitry 170 includes command execution logic 172 that is configured to execute commands (e.g., control signals) received from the host device 152. The command execution logic 172 can execute the commands based, at least in part, on the contents of registers 174. The registers 174 can be loaded with trim values 176 received from the host device 152. Trim values 156 can also and/or alternatively be used by the NVM of the NVM package 154. For instance, the trim values 156 can be stored in the control circuitry 170 and sent to the NVM, such as raw NAND dies. The trim values 156 can be used to control the data sampling of the NVM, such as controlling voltage levels and timing for the NVM.

The registers 174 can be accessible by the command execution logic 172 (as part of and/or separate from the command execution logic 172) and can be used in a variety of capacities, such as storing data, addresses, instructions, conditions, and status information. The registers 174 can be loaded with the trim values 176 (received from the host device 152) while the NVM package 154 is booting.

The host controller 162 can perform a variety of operations for the NVM package 154 that the memory controller 124 may perform with regard to the NVM package 104 as described above with regard to FIG. 1A. For example, the host controller 162 can perform memory management operations for the NVM package 154, such as wear leveling. The system 150 may be termed "raw NVM" (or "raw NAND" for NAND flash memory).

The control circuitry 172 uses a shared internal bus 178 to access NVM used for persistent data storage. In the example system 150, such NVM is depicted as including multiple memory dies 180a-n that include NVMs 182a-n. The memory dies can be a variety of memory dies, such as integrated circuit (IC) dies. Although only the single shared bus 178 is depicted with regard to the NVM package 154, an NVM package can include more than one shared internal bus.

Each internal bus can be connected to multiple memory dies (e.g., 2, 3, 4, 8, 32, etc.), as depicted with regard to the multiple memory dies 180a-n. The memory dies 180a-n can be physically arranged in a variety of configurations, such as being stacked. The NVM 182a-n can be any of a variety of NVM, such as NAND flash memory based on floating gate or charge trapping technology, NOR flash memory, EPROM, EEPROM, FRAM, MRAM, PCM, or any combination thereof. The control circuitry 170 can perform operations (e.g., read/write operations) on the NVM 182a-n using the trim values 176 provided by the host device 152 to boot the NVM package 154.

Although the systems 100 and 150 are discussed separately, other systems combining features from these two systems are also possible. For example, in addition to providing the firmware 106 to the NVM package 104, which includes the memory controller 124, the host device 102 may also be configured to provide trim values (e.g., the trim values 156) to the NVM package 154 for configuration of various components of the NVM package 154.

Figure 2:
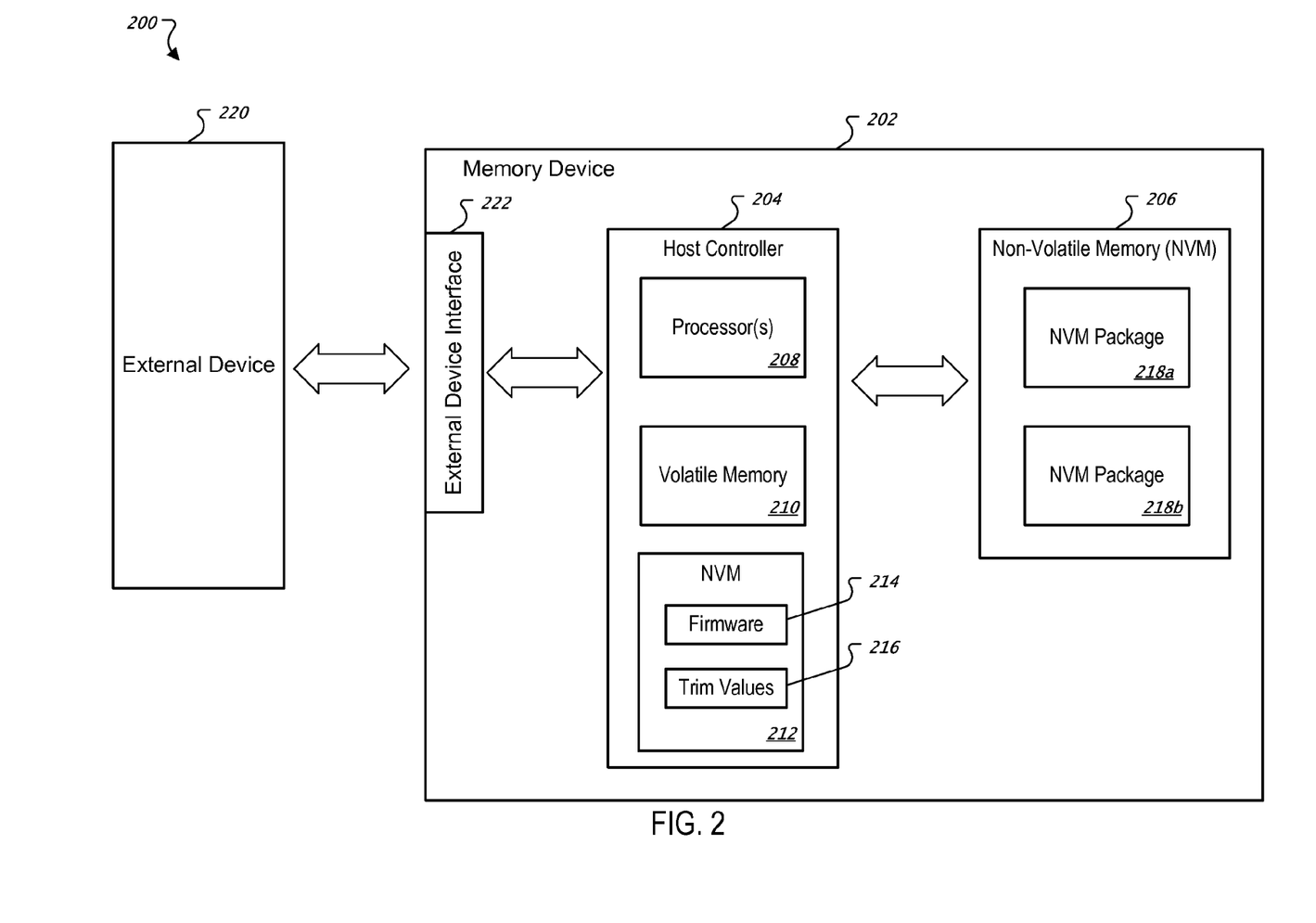
FIG. 2 is a diagram depicting an example system that includes a memory device with a host controller that is configured to provide boot information to various NVM packages.

FIG. 2 is a diagram depicting an example system 200 that includes a memory device 202 with a host controller 204 that is configured to provide boot information to various NVM packages. The memory device 202 can be any of a variety of memory devices, such as a portable media player, a cellular telephone, a pocket-sized personal computer, a personal digital assistant (PDA), a desktop computer, a laptop computer, a tablet computing device, and/or a removable/portable storage device (e.g., a flash memory card, a USB flash memory drive).

The example memory device 202 includes a host controller 204 and NVM 206. The host controller 204 can be similar to the host controller 112 and/or the host controller 162 described above with regard to FIGS. 1A-B. The host controller 204 includes one or more processors 208, volatile memory 210, and NVM 212. The processors 208 can be any variety of processors, such as microprocessors, central processing units (CPUs), graphics processing units (GPUs), or any combination thereof. The volatile memory 210 can be any of a variety of volatile memory, such as RAM and cache memory. The volatile memory 210 can be used by the processors 208 to perform various operations, such as retrieving and processing data stored in the NVM 206. The NVM 212 can be any of a variety of NVM, such as flash memory (e.g., NAND flash memory, NOR flash memory). The NVM 212 can persistently store boot information, such as firmware 214 and/or trim values 216. The firmware 214 can be similar to the firmware 116-120 described above with regard to FIG. 1A, and the trim values 216 can be similar to the trim values 166 described above with regard to FIG. 1B. The firmware 214 and/or trim values 216 can be loaded into the volatile memory 210 (e.g., when the host controller 204 boots) and transmitted to the NVM 206 from the volatile memory 210 as needed.

The NVM 206 can include one or more NVM packages 218a-b. The NVM packages 218a-b can each be similar to the NVM package 104 and/or the NVM package 154 described above with regard to FIGS. 1A-B. For example, the NVM packages 218a-b can each include a plurality of memory dies with NVM (e.g., memory dies 136a-n and NVM 138a-n), one or more memory controllers (e.g., memory controller 124), and/or control circuitry (e.g., the control circuitry 170) that are booted using the firmware 214 and/or the trim values 216. The NVM 206 can include any number of NVM packages (e.g., 2, 3, 4, 8, 16, etc.).

As described above with regard to FIGS. 1A-B, management of the NVM can be performed by the host controller 204 and/or controllers of the NVM packages 218a-b. For instance, the host controller 204 can be configured to adjust operation of the NVM packages 218a-b by providing different firmware and/or trim values to the NVM packages 218a-b. In implementations where controllers of the NVM packages 218a-b control at least a portion of the memory management operations (e.g., error correction, wear leveling, etc.), the NVM packages 218a-b may be considered to be "managed" NVM.

The system 200 is depicted as also including an external device 220 that can be communicatively connected (directly and/or indirectly) to the memory device 202. Communication between the external device 220 and the memory device 202 can include the transmission of data and/or instructions between the two devices. The external device 220 can be any of a variety of electronic devices, including a desktop computer, a laptop computer, a server system, and a media computing device (e.g., a media server, a television, a stereo system). The memory device 202 can communicate with the external device 220 through a physical and/or wireless connection using an external device interface 222 (e.g., wireless chip, USB interface, etc.).

For instance, in some implementations, the memory device 202 can be a portable media player and the external device 220 can be a desktop computer that can transmit media files (e.g., audio files, video files, etc.) to each other over a physical connection (e.g., USB cable).

The external device 220 may provide updated and/or new firmware and/or trim values for the NVM 206 to the memory device 202. For instance, the memory device 202 can be configured to periodically check whether updated versions of the firmware 214 and/or trim values 216 are available from the external device 220 (and/or the external device 220 may check versions of the firmware 214 and/or trim values 216 and provided updated boot information to the memory device 202 when available).

The firmware 214 and/or trim values 216 can be used by each of the NVM packages 218a-b. For instance, a single copy of the firmware 214 and/or trim values 216 can be stored in the NVM 212 and used across multiple NVM packages, such as the NVM packages 218a-b.

Figure 3:
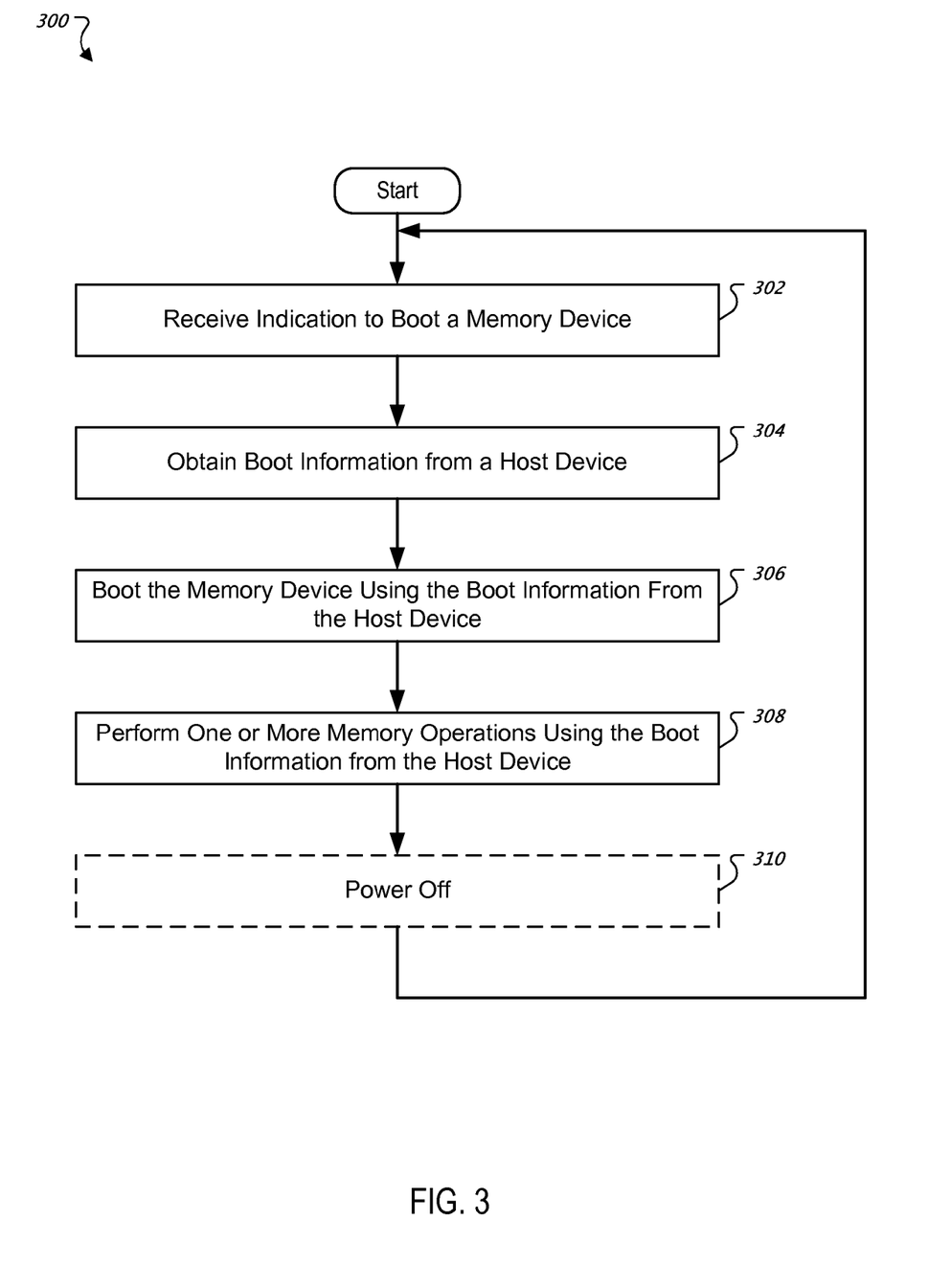
FIG. 3 is a flowchart depicting an example process for booting a memory device from a host.

FIG. 3 is a flowchart depicting an example process 300 for booting a memory device from a host. The process 300 can be performed by a variety of memory devices, including the NVM package 104 described above with regard to FIG. 1A, the NVM package 154 described above with regard to FIG. 1B, and/or the memory device 202 described above with regard to FIG. 2.

The process 300 includes receiving, at a memory device, an indication to boot the memory device (at 302). Such an indication can include a variety of signals and/or commands that a memory device, e.g., the NVM package 104 and/or the NVM memory package 154, may receive. For example, a chip enable assertion signal received from a host device (e.g., the host device 102 and/or the host device 152) can be an indication to boot. In another example, a memory device being powered on from an unpowered state can serve as an indication to boot the memory device. In another example, a boot command received from a host (e.g., the host device 102 and/or the host device 152) can be an indication to boot a memory device. In some implementations, a memory device may determine that it should reboot. For example, the memory controller 124 of the NVM package 104 may determine that it should reboot after encountering a particular type of error and provide itself an indication to boot.

In response to receiving the indication to boot, the memory device can obtain boot information from a host device (at 304). Boot information can include a variety of information that is used to boot and operate a memory device, including firmware (e.g., the firmware 106) and/or trim values (e.g., the trim values 156). Obtaining boot information can include providing an indication (e.g., the status indicator 108) to a host device that a memory device is ready to receive boot information, receiving the boot information in portions (e.g., data chunks) from the host device, and providing confirmation(s) (e.g., the status indicator 108) to the host device each of the portions have been successfully received by the memory device.

The memory device can boot using the boot information received from the host device (at 306). For example, the memory controller 124 can boot the NVM package 104 by loading the firmware 130 received from the host device 102 into the volatile memory 128 and proceeding to boot the NVM package 104 using the firmware 130. In another example, the trim values 176 received from the host device 152 can be loaded into the registers 174 and the NVM package 154 can be booted.

After booting the memory device, one or more memory operations can be performed using the boot information from the host device (at 308). For example, the memory controller 124 can perform memory operations as provided by the firmware 130 and/or as commanded by the host device 102. For instance, if the operational firmware 116 is provided to the NVM package 104, the memory controller 124 can perform standard memory operations (e.g., read, write, erase) and, in some implementations, can perform memory management operations, such as wear leveling and error correction. In another example, if the debug firmware 118 is provided to the NVM package 104, the memory controller can perform debug operations like generating and storing a debug log. In a further example, if the manufacturing firmware 120 is provided to the NVM package 104, the memory controller 124 can perform testing operations to determine whether various components of the NVM package 104 (e.g., the NVM 138*a-n*, the host interface 122, the processor/microprocessor 126) have been installed properly and are operating according to their respective technical specifications. In another example, the control circuitry 170 can perform commands transmitted to the NVM package 154 by the host device 152 using the trim values 176 contained in the registers 174.

The memory device may power off once the memory operations are completed (at 310). For example, a host device (e.g., the host device 102 and/or 152) may cause a memory device (e.g., the NVM package 104 and/or 154) to power down by providing a chip enable deassertion signal to the memory device and/or toggling off the power supplied to the memory device. In another example, a memory device (e.g., the NVM package 104) may determine that, after a threshold amount of time has elapsed with the device being idle, that the memory device will power down.

The process 300 can repeat continually—meaning that a memory device may reboot using boot information from a host device as the memory device continuously transitions between various power and/or operational states. For instance, a memory device may be powered down when it is not in use in order to reduce power consumption by the memory device (and possibly extend battery life). The memory device may be powered down and up frequently. Each of these transitions from an off state to an on state can cause the memory device to boot using the boot information obtained from the host.

Figure 4:
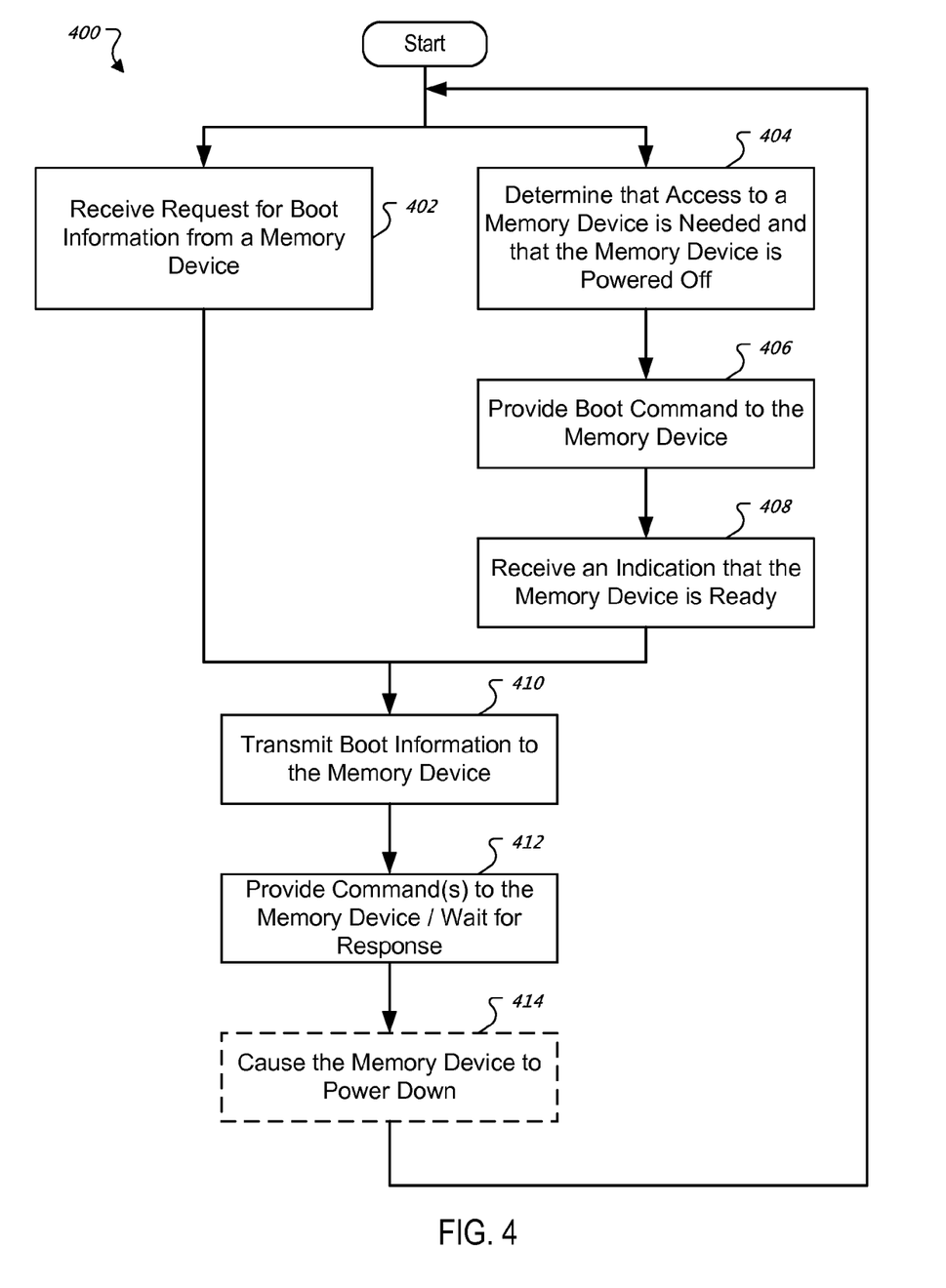
FIG. 4 is a flowchart depicting an example process for booting a memory device from a host.

FIG. 4 is a flowchart depicting an example process 400 for booting a memory device from a host. The process 400 can be performed by a variety of host devices, such as the host device 102 described above with regard to FIG. 1A, the host device 152 described above with regard to FIG. 1B, and/or the memory device 202 described above with regard to FIG. 2.

In some implementations, the process 400 begins by receiving a request for boot information from a memory device (at 402). For example, the NVM package 104 can provide a request for boot information in the form of firmware to the host device 102.

In some implementations, the process 400 begins by determining that access to a memory device is needed and that the memory device is powered off (at 404). For example, the host device 102 may receive a read request (or identify a need to read data) pertaining to a range of logical addresses, determine that the range of logical addresses corresponds to the NVM package 104, and determine that the NVM package 104 is powered off. Based on such a determination, a boot command can be provided to the memory device (at 406). For example, the host device 102 can provide a command to "boot from host" to the NVM package 104. In response to providing such a command, a host device can wait to provide boot information to the memory device until an indication is received that the memory device is ready to receive the boot information (at 408).

Boot information can be transmitted to the memory device (at 410). For example, the host device 102 can transmit one or more of the firmware 116-120 to the NVM package 104. In another example, the host device 152 can transmit the trim values 166 to the NVM package 154. The boot information can be transmitted from volatile memory of the host device.

Once the boot information has been transmitted to a memory device, the host can provide one or more commands to the memory device and/or wait for a response from the memory device (at 412). For instance, if the host device 102 transmits the debug firmware 118 to the NVM package 104, then the host device 102 may issue one or more commands for the NVM package 104 to collect and provide particular debug information to the host device 102, and can wait for the debug information to be provided to the host device 102. In another example, the host device 152 can provide a read command to the NVM package 154 after the NVM package 154 has been successfully booted using the transmitted trim values 156, and wait for the requested data from the NVM package 154.

If there are no more commands to provide to a memory device and/or requested information to receive from the memory device, a host may cause the memory device to power down (at 414). For example, the host device 102 can provide a chip enable deassertion signal to the NVM package 104, which can cause the NVM package 104 to power down.

The process 400 can be repeated by a host device, such as the host device 102 and/or the host device 152. For example, the host device 102 may cause the NVM package 104 to boot using boot information from the host device 102 when the NVM package 104 is needed by the host device 102 to perform some task (e.g., retrieve data, store data, test components, identify debug information), and may cause the NVM package 104 to power down when it is not needed, so as to reduce power consumption.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. Moreover, other mechanisms for booting from a host may be used. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for selectively using host stored firmware stored in volatile memory of a host device in lieu of firmware stored on a memory device to boot the memory device, comprising:

receiving, at a memory device, an instruction to boot the memory device, wherein the memory device includes non-volatile memory accessible by a controller of the memory device;

in response to receiving the instruction to boot the memory device, obtaining, by the memory device, the host stored firmware from a host device, wherein the host device is separate from and communicatively coupled to the memory device, wherein the host stored firmware is loaded into volatile memory of the host device during bootup of the host device and wherein the host stored firmware is used to boot the memory device in lieu of firmware stored on the memory device; and booting the memory device using the host stored firmware obtained from the volatile memory of the host device, wherein the memory device boots separately from the host device, and the host device performs operations using data or instructions stored in the non-volatile memory and obtained through communication with the memory controller of the memory device.

2. The method of claim 1, wherein the instruction to boot the memory device is received from the host device and instructs the memory device to boot using host stored firmware from the host device and to override instructions to boot from firmware stored in the non-volatile memory of the memory device.

3. The method of claim 1, further comprising, after the memory device has booted using the host stored firmware from the host device, performing one or more operations on the memory device using the host stored firmware.

4. The method of claim 3, wherein the host stored firmware includes operational firmware having instructions that cause the controller to perform read, write, and erase operations on the non-volatile memory and the one or more operations performed on the memory device include one or more of the read, write, and erase operations.

5. The method of claim 4, wherein the operational firmware further includes instructions that cause the controller to perform memory management operations on the non-volatile memory.

6. The method of claim 5, wherein one or more of the memory management operations include wear-leveling operations.

7. The method of claim 3, wherein the host stored firmware includes debug firmware having instructions that cause the controller to perform debug operations on the memory device; and
wherein the one or more operations performed on the memory device include one or more of debug operations.

8. The method of claim 3, wherein the host stored firmware includes manufacturing firmware having instructions that cause the controller to test installation and operation of components of the memory device, including at least the non-volatile memory and the one or more operations performed on the memory device include one or more operations to test installation and operation of one or more of the components of the memory device.

9. The method of claim 1, wherein the non-volatile memory includes flash memory.

10. A method for selectively using host stored firmware stored in volatile memory of a host device in lieu of firmware stored on a memory device to boot the memory device, comprising:
providing, by a host device, a boot command to a memory device instructing the memory device to boot using host stored firmware from the host device, wherein the host device is separate from and communicatively coupled to the memory device, and the memory device includes non-volatile memory, wherein the host stored firmware is loaded into volatile memory of the host device during bootup of the host device and wherein the host stored firmware is used to boot the memory device in lieu of firmware stored on the memory device;
receiving, at the host device, an indication that the memory device is ready to receive the host stored firmware from the host device; and
in response to receiving the indication, transmitting, by the host device, the host stored firmware to the memory device, wherein transmission of the firmware to the memory device causes the memory device to boot using the host stored firmware, wherein the memory device boots separately from the host device.

11. The method of claim 10, wherein the host stored firmware includes operational firmware having instructions that cause a controller of the memory device to perform read, write, and erase operations on the non-volatile memory of the memory device.

12. The method of claim 10, wherein the host stored firmware includes debug firmware having instructions that cause a controller of the memory device to perform debug operations on the memory device.

13. The method of claim 10, wherein the host stored firmware includes manufacturing firmware having instructions that cause a controller of the memory device to test installation and operation of components of the memory device, including at least the non-volatile memory.

14. The method of claim 10, further comprising, in response to a request to access data stored in one of a plurality of memory devices that are accessible to the host device, determining that the requested data is stored by memory device; and
wherein the boot command is provided to the memory device in response to determining that the requested data is stored by the memory device.

15. A memory device comprising:
non-volatile memory;
a host interface adapted to communicatively couple the memory device to a host device, wherein the host device comprises firmware stored in volatile memory of the host device, the host device is operative to turn the non-volatile memory and a memory controller ON and OFF, and the host stored firmware is loaded into volatile memory of the host device during bootup of the host device; and
wherein the memory controller is configured to perform memory operations on the non-volatile memory and adapted to communicate with the host device through the host interface, wherein the memory controller is further configured to:
receive an instruction to boot the memory device from the host device through the host interface;
in response to receiving the instruction, obtain the firmware from the host device; and
boot the memory device using the firmware from the host device, wherein the memory device boots separately from the host device, and the host device performs operations using data or instructions stored in the non-volatile memory and obtained through communication with the memory controller of the memory device through the host interface.

16. The memory device of claim 15, wherein the firmware includes operational firmware having instructions that cause the memory controller to perform read, write, and erase operations on the non-volatile memory.

17. The memory device of claim 16, wherein the operational firmware further has instructions that cause the memory controller to perform memory management operations on the non-volatile memory.

18. The memory device of claim 15, wherein the firmware includes debug firmware having instructions that cause the memory controller to perform debug operations on the memory device.

19. The memory device of claim 15, wherein the firmware includes manufacturing firmware having instructions that cause the memory controller to test installation and operation of components of the memory device, including at least the non-volatile memory.

20. The memory device of claim 15, wherein the non-volatile memory includes one or more flash memory dies.

21. A system comprising:
a host device comprising volatile memory for storing firmware when the host device is turned ON;
a memory device comprising non-volatile memory and a memory controller configured to perform memory operations on the non-volatile memory and to communicate with the host device through a host interface, wherein the host device is further configured to:
selectively turn the memory device ON and OFF;
in response to selectively turning the memory device ON, provide an instruction to boot the memory device; and
provide the firmware stored in the volatile memory of the host device to the memory device; and
wherein, in response to the instruction, the memory controller is further configured:
to boot the memory device using the firmware from the host device, wherein the memory device boots separately from the host device, and the host device performs operations using data or instructions stored in the non-volatile memory and obtained through communication with the memory controller of the memory device through the host interface.

22. The system of claim 21, wherein the firmware includes operational firmware having instructions that cause the memory controller to perform read, write, and erase operations on the non-volatile memory.

23. The system of claim 22, wherein the operational firmware further has instructions that cause the memory controller to perform memory management operations on the non-volatile memory.

24. The system of claim 21, wherein the firmware includes debug firmware having instructions that cause the memory controller to perform debug operations on the memory device.

25. The system of claim 21, wherein the firmware includes manufacturing firmware having instructions that cause the memory controller to test installation and operation of components of the memory device, including at least the non-volatile memory.

26. The system of claim 21, wherein the non-volatile memory includes flash memory.

* * * * *

UNITED STATES PATENT AND TRADEMARK OFFICE
CERTIFICATE OF CORRECTION

| | | |
|---|---|---|
| PATENT NO. | : 8,706,955 B2 | Page 1 of 1 |
| APPLICATION NO. | : 13/175597 | |
| DATED | : April 22, 2014 | |
| INVENTOR(S) | : Anthony Fai et al. | |

It is certified that error appears in the above-identified patent and that said Letters Patent is hereby corrected as shown below:

Title Page, Item (73), under "Assignee" delete "Cupertion," and insert -- Cupertino, --, therefor.

Signed and Sealed this
Nineteenth Day of January, 2016

Michelle K. Lee
*Director of the United States Patent and Trademark Office*